(12) United States Patent
Yamashita et al.

(10) Patent No.: US 6,856,364 B2
(45) Date of Patent: Feb. 15, 2005

(54) COLOR FILTER AND LIQUID CRYSTAL DISPLAY DEVICE

(75) Inventors: Tetsuo Yamashita, Otsu (JP); Jun Tsukamoto, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/683,389

(22) Filed: Oct. 14, 2003

(65) Prior Publication Data

US 2004/0076770 A1 Apr. 22, 2004

Related U.S. Application Data

(62) Division of application No. 10/149,071, filed as application No. PCT/JP00/08562 on Dec. 4, 2000.

(30) Foreign Application Priority Data

Dec. 9, 1999 (JP) .......................................... 11-350006
Mar. 17, 2000 (JP) .......................................... 2000-75396

(51) Int. Cl.$^7$ .......................... G02F 1/1335; G03F 9/00
(52) U.S. Cl. ............................................. 349/106; 430/7
(58) Field of Search ................................ 349/106; 430/7

(56) References Cited

U.S. PATENT DOCUMENTS 5,237,438 A * 8/1993 Miyashita et al. .......... 349/119

* cited by examiner

Primary Examiner—Tarifur R. Chowdhury
Assistant Examiner—Jeanne Andrea Di Grazio
(74) Attorney, Agent, or Firm—Morrison & Foerster LLP

(57) ABSTRACT

By preparing a color filter including blue dots whose chromaticity coordinates (z, Z) in the XYZ colorimetric system, measured with CIE standard light source C, satisfy the relational expressions $114 > Z > -1087023z^4 + 3205105z^3 - 3545958z^2 + 1744329z - 321773$ and $0.73 \leq z \leq 0.81$, a color filter exhibiting an excellent color reproducibility and a high transmittance can be realized and thus a liquid crystal display device capable of displaying as colorful images as in CRT television sets can be achieved.

5 Claims, 1 Drawing Sheet

COLOR FILTER AND LIQUID CRYSTAL DISPLAY DEVICE

REFERENCE TO RELATED APPLICATIONS

This application is a division of Ser. No. 10/149,071, filed Jun. 7, 2002, currently pending, which is a National Stage application of PCT/JP00/08562 filed Dec. 4, 2000.

TECHNICAL FIELD

The present invention relates to color filters and liquid crystal display devices using the color filters, and particularly relate to a liquid crystal display device capable of reproducing a wide range of colors.

BACKGROUND ART

Liquid crystal display devices (LCDs) are used for various apparatuses, such as notebook PCs, personal digital assistants, and digital cameras, which take advantage of the light weight, small thickness, reduced power consumption, and the like of the liquid crystal display devices. The display properties (luminance, color reproducibility, viewing angle characteristics, and the like) of the liquid crystal display devices have been much improved, and therefore, use of the liquid crystal display devices is spreading to desktop monitors in addition to conventional notebook PCs. In addition, by improving the color reproducibility of desktop LCD monitors, liquid crystal television sets having a big screen are being developed in these days. In general, however, improving the color reproducibility leads to a reduced transmittance of the color filter. Accordingly, a color filter having a high transmittance is desired.

While the liquid crystal display devices for desktop monitors require a color reproducibility of 50 to 65% in NTSC (National Television System Committee) ratio, liquid crystal television sets require a wider range of color reproducibility of 60 to 75% in NTSC. In addition to a wider range of color reproducibility, it is desired that, in the liquid crystal television set, each of the red, green, and blue colors has the same tone as that of conventional CRT television sets. The color properties of the conventional CRT television sets are substantially the same as in the EBU (European Broadcasting Union) standards in which the chromaticity coordinates of red, green, and blue in the XYZ colorimetric system are set at (0.640, 0.330), (0.290, 0.600), and (0.150, 0.060), respectively. Also, the color temperature of the white color displayed by a conventional CRT television set is set at about 9000 to 10000 K. This temperature is higher than the color temperature of the white color displayed by a liquid crystal display device for desktop monitors, which is set at 6000 to 7500 K. The liquid crystal television sets also need a high color temperature of the white color displayed by them.

Liquid crystal display devices, usually, display color images using a backlight source and a color filter in combination. Such a conventional combination of a backlight source and a color filter, however, does not lead to a color reproducibility, color tone, and a white color temperature satisfying the requirements for liquid crystal television sets. Specifically, the combination brings about problems in that (1) a small range of colors can be reproduced; (2) color tones in pixels is far away from the EBU standards; (3) the color temperature of the white color displayed thereby is low; and the like.

On the other hand, when a backlight source having a high color temperature (about 10000 K) is used for a liquid crystal display device in combination with the conventional color filter in order to increase the color temperature of the white color displayed thereby, the color tone takes on a blue tinge and thus fades. In particular, the red tone shifts to blue excessively in comparison with when a light source for desktop monitors is used. For example, when a backlight source having a high color temperature is used in combination with a color filter for desktop monitors, the red chromaticity, particularly the x value, is reduced to 0.590 to 0.615, and the red chromaticity is far from the EBU standard of (0.640, 0.330), which means the standard television color.

In order to prepare a color filter satisfying the EBU standards using a conventional backlight source for desktop monitors, it is required to increase the thickness of blue dots and the concentration of pigments and to improve the color purity. In this instance, unfortunately, the transmittance of the blue dots is greatly reduced. Consequently, the white color takes on a yellow tinge and thus the display characteristics deteriorate. Also, the white color temperature is low and thus the requirements for liquid crystal television sets are not satisfied.

In addition to the reduction of the transmittance, problems are caused in workability of the color filter and the shape of the dots. For example, when the thickness of the dots is increased to improve the color reproducibility but the concentration of pigments is not changed, the difference in height between the blue dots and the other dots is increased. This difference causes poor alignment of liquid crystal molecules and thus degrades the display quality. Also, even when the concentration of pigments is increased and the thickness of dots is reduced to improve the color reproducibility, workability is degraded and, for example, the dots are liable to crack.

Considering characteristics, such as transmittance, contrast, and chromaticity, pigments for the blue dots are selected from blue and violet colors, depending on the application. Exemplary pigments for the blue dots include Pigment Blue PB-6, PB-15 (15:1, 15:2, 15:3, 15:4, 15:6), PB-21, PB-22, PB-28, PB-60, and PB-64 and Pigment Violet PV-14, PV-19, PV-23, PV-29, PV-32, PV-33, PV-36, PV-37, PV-38, PV-40, and PV-50. In practice, some pigments having excellent characteristics are selected from these pigments. Blue pigments particularly with a phthalocyanine skeleton have excellent light stability and heat resistance, and therefore, they are suitable for use in color filters. When adjustment of the chromaticity is required, dioxazine violet is added to a blue pigment having a phthalocyanine skeleton. However, it is know that the transmittance is reduced in this instance (Japanese Unexamined Patent Application Publication Nos. 9-95638 and 9-197663).

As described above, the conventional combination of the back light and the color filter does not satisfy all the color characteristics (color reproducibility, color tone, and color temperature of the white color displayed), which are the requirements for liquid crystal display devices capable of reproducing a wide range of colors, and particularly for liquid crystal television sets.

Also, preparing a color filter having an excellent color reproducibility using a conventional blue paste causes problems such as transmittance shortage and poor alignment of liquid crystal molecules, and therefore a liquid crystal display device capable of providing high-quality images has not yet been achieved.

DISCLOSURE OF INVENTION

Considering the shortcomings of the conventional art, the present invention has been devised. An object of the present invention is to provide a color filter having both excellent color reproducibility and high transmittance and contributing to increase of display quality and reduction of power consumption in liquid crystal display devices. Another object of the present invention is to provide a liquid crystal display device capable of displaying as colorful images as in CRT television sets. In order to solve the conventional shortcomings, the inventors have studied hard, consequently finding the following color filter and liquid crystal display device.

(1) A color filter comprising blue dots whose chromaticity coordinates (z, Z) in the XYZ colorimetric system, measured with CIE standard light source C, satisfy the relational expressions $114 > Z > -1087023z^4 + 3205105z^3 - 3545958z^2 + 1744329z - 321773$ and $0.73 \leq z \leq 0.81$.

(2) A color filter comprising blue dots containing Pigment Blue 15:6 (PB15:6) and Pigment Violet 23 (PV23) such that the weight ratio of PB15:6 to PV23 is in the range of 96/4 to 70/30, the blue dots having a chromaticity coordinate z in the XYZ colorimetric system, measured with CIE standard light source C, satisfying $0.73 \leq z \leq 0.81$.

(3) A color filter according to (1) or (2), wherein the chromaticity coordinates (x, y) in the XYZ colorimetric system of the blue dots, measured with CIE standard light source C, satisfy the expressions $0.13 \leq x \leq 0.15$ and $0.08 \leq y \leq 0.12$.

(4) A color filter according to (3), further comprising red dots, wherein the chromaticity coordinates (x, y) in the XYZ colorimetric system of the red dots, measured with CIE standard light source C, satisfy the expressions $0.635 \leq x \leq 0.665$ and $0.31 \leq y \leq 0.35$.

(5) A color filter according to (3), further comprising green dots, wherein the chromaticity coordinates (x, y) in the XYZ colorimetric system of the green dots, measured with CIE standard light source C, satisfy the expressions $0.22 \leq x \leq 0.34$ and $0.56 \leq y \leq 0.65$.

(6) A liquid crystal display device comprising: a color filter comprising at least blue dots, red dots, and green dots; and a backlight source, wherein the chromaticity coordinates (x, y) in the XYZ colorimetric system of the blue dots, measured with CIE standard light source C, satisfy the expressions $0.13 \leq x \leq 0.15$ and $0.08 \leq y \leq 0.12$, and the chromaticity coordinates (x, y) in the XYZ colorimetric system of the backlight source satisfy the expressions $0.265 \leq x \leq 0.29$ and $0.24 \leq y \leq 0.30$.

(7) A liquid crystal display device according to (6), wherein the chromaticity coordinates (x, y) in the XYZ colorimetric system of the red dots, measured with CIE standard light source C, satisfy the expressions $0.635 \leq x \leq 0.665$ and $0.31 \leq y \leq 0.35$.

(8) A liquid crystal display device according to (7), wherein the chromaticity coordinates (x, y) in the XYZ colorimetric system of the green dots, measured with CIE standard light source C, satisfy the expressions $0.22 \leq x \leq 0.34$ and $0.56 \leq y \leq 0.65$.

(9) A liquid crystal display device according to (6), wherein the chromaticity coordinates (z, Z) in the XYZ colorimetric system of the blue dots, measured with CIE standard light source C, satisfy the expressions $114 > Z > -1087023z^4 + 3205105z^3 - 3545958z^2 + 1744329z - 321773$ and $0.73 \leq z \leq 0.81$.

(10) A liquid crystal display device according to (6), wherein the blue dots comprise Pigment Blue 15:6 (PB15:6) and Pigment Violet 23 (PV23) such that the mixture ratio of PB15:6 to PV23 is in the range of 96/4 to 70/30, and the chromaticity coordinate z in the XYZ colorimetric system of the blue dots, measured with CIE standard light source C, satisfies $0.73 \leq z \leq 0.81$

(11) A liquid crystal display device according to (6), wherein the color temperature of the white color displayed thereby is in the range of 9000 to 11000 K.

The color temperature T (K) here is derived from the following equations when the chromaticity coordinates of the white color displayed by the device in the XYZ colorimetric system is (Wx, Wy).

$$n = (Wx - 0.332)/(Wy - 0.1858)$$

$$T(K) = -437n^3 + 3601n^2 - 6861n + 5514.31$$

BEST MODE FOR CARRYING OUT THE INVENTION

Figure 1:
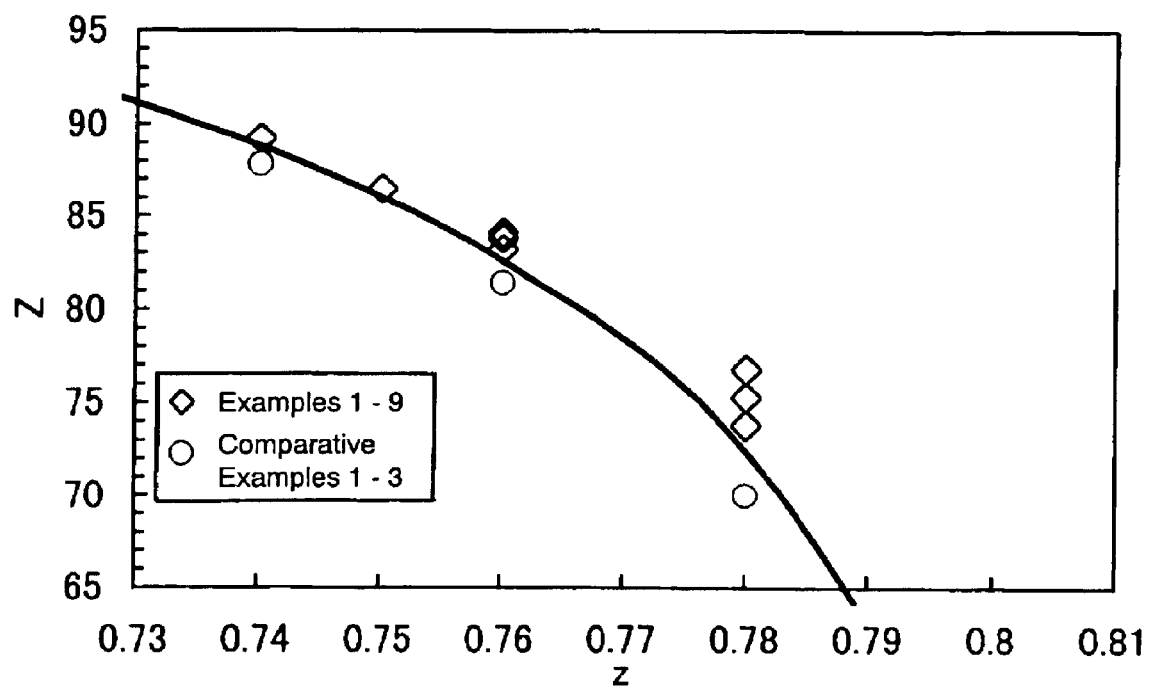
FIG. 1 is a graph showing changes in chromaticity coordinates (z, Z) of the blue dots in the XYZ colorimetric system, measured with CIE standard light source C, when the mixture ratio of Pigment Blue PB15:6 to Pigment Violet PV23 is changed in accordance with Table 1.

When a thin layer such as ITO is disposed on a color filter of the present invention, the chromaticity coordinates of the color filter are measured using glass having the thin layer thereon as a reference in order to eliminate the change in color tones arising from interference by the thin layer. When a thin layer such as ITO is not formed on the color filter, the chromaticity coordinates of the color filter are measured using glass as a reference. When glass having a thin layer thereon is used as a reference, the thin layer must be formed under the same conditions as in the thin layer formed on the color filter. The chromaticity coordinates of the color filter of the present invention may be measured by an immersion method using a liquid having substantially the same refractive index as the liquid crystal in order to eliminate the change in color tones arising from interference by the thin layer, such as ITO.

The color filter of the present invention has at least three color dots, red, green, and blue, and is used in combination with a three-wavelength fluorescent light source. The color filter is formed on, but not limited to, a transparent substrate such as glass and a polymer film, and it may be formed on a substrate having switching devices. The color filter is patterned in a stripe manner, a delta arrangement, or the like; however, it is not limited to this. A fixed columnar spacer may be disposed on the color filter, if necessary.

The pixels are formed by photolithography, printing, or electrodeposition. Considering pattern formability, it is preferable to use photolithography. Exemplary resins forming the pixels include various kinds of resins, such as acrylic resins, alkyd resins, melamine resins, polyvinyl alcohol, phenolic resins, polyamides, polyamide-imides, and polyimides, irrespective of photosensitivity. In particular, preferably, resins soluble in alkaline solution are used because they allow simple equipment for developing or etching processes. Preferably, resins having a carboxyl group are used as an alkali-soluble resin, and specifically an acrylic resin and polyimide are used in view of solvent resistance. Polyimide is more preferable because precursors of polyimide serve as a dispersing agent for pigments. Also, polyimide is preferable in view of the thermal resistance of the color filter.

General coloring materials may be used as the pigments in the present invention whether they are organic pigments, inorganic pigments, or dyes.

It is important that the color filter of the present invention includes blue dots whose chromaticity coordinates (z, Z) in the XYZ colorimetric system, measured with the C light source, satisfy the relationships $114 > Z > -1087023z^4 + 3205105z^3 - 3545958z^2 + 1744329z - 321773$ and $0.730 \leq z \leq 0.810$. When the above-described expressions are not satisfied, the transmittance of the blue dots decreases, and thus they do not exhibit excellent display characteristics. Preferably, the chromaticity coordinates (z, Z) of the blue dots satisfy the relationships $114 > Z > -1087023z^4 + 3205105z^3 - 3545958z^2 + 1744329z - 321773$, and $0.730 \leq z \leq 0.810$, and more preferably, $114 > Z > -1361051z^4 + 4044634z^3 - 4508657z^2 + 2234150z - 415091.5$, and $0.735 \leq z \leq 0.81$.

Z is a parameter representing the transmittance of blue light and is preferably high, but is limited to 114. In contrast, when Z is less than the value defined by the above-described expressions, the transmittance of blue light is substantially the same as in the case of using the conventional color filters; hence it does not satisfy the requirements for liquid crystal television sets. Also, when z is out of the above ranges, excellent color reproducibility is not exhibited.

Preferably, the chromaticity coordinates (x, y) of the blue dots, measured with CIE standard light source C, satisfy the relationships $0.13 \leq x \leq 0.15$ and $0.08 \leq y \leq 0.12$, preferably, $0.135 \leq x \leq 0.145$ and $0.085 \leq y \leq 0.115$, and more preferably, $0.136 \leq x \leq 0.142$ and $0.085 \leq y \leq 0.11$. When x and y of the blue dots are out of the ranges described above, a blue color in accordance with the EBU standards, which define standard colors for television sets, cannot be achieved.

In red dots, preferably, the chromaticity coordinates (x, y) measured with CIE standard light source C satisfy the relationships $0.635 \leq x \leq 0.665$ and $0.31 \leq y \leq 0.35$. More preferably, the chromaticity coordinates satisfy the relationships $0.635 \leq x \leq 0.665$ and $0.32 \leq y \leq 0.34$, yet more preferably, $0.64 \leq x \leq 0.66$ and $0.32 \leq y \leq 0.34$, and yet still more preferably, $0.645 \leq x \leq 0.66$ and $0.32 \leq y \leq 0.34$. It is not preferable that x of the red dots measured with CIE standard light source C is smaller than 0.635, because the red color is far from the EBU red color standard (0.640, 0.330), which defines standard colors for television sets, and thus excellent color reproducibility cannot be exhibited. Also, it is not preferable that x of the red dots is larger than 0.665, because the transmittance of the dots is reduced and thus the luminance of the liquid crystal display device is reduced.

Preferably, the chromaticity coordinates (x, y) of the green dots, measured with CIE standard light source C, satisfy the relationships $0.20 \leq x \leq 0.34$ and $0.56 \leq y \leq 0.65$, more preferably, $0.21 \leq x \leq 0.33$ and $0.56 \leq y \leq 0.64$, and still more preferably, $0.215 \leq x \leq 0.33$ and $0.565 \leq y \leq 0.63$. It is not preferable that y of the green dots measured with CIE standard light source C is smaller than 0.56, because the green color is far from the EBU green color standard (0.290, 0.600), which defines standard colors for television sets, and thus excellent color reproducibility cannot be exhibited. Also, it is not preferable that y of the green dots is larger than 0.65, because the transmittance of the dots is reduced and thus the luminance of the liquid crystal display device is reduced.

Preferably, all blue, red, and green dots satisfy the above-described ranges so that color characteristics satisfying the requirements for liquid crystal television sets can be achieved.

In order to obtain dots having the above-described color properties, at least one selected from various pigments may be used and other pigments may be added as long as the color properties are not degraded. Exemplary typical pigments include Pigment Reds PR-2, PR-3, PR-22, PR-38, PR-149, PR-166, PR-168, PR-177, PR-209, PR-224, PR-242, and PR-254; Pigment Oranges PO-5, PO-13, PO-17, PO-31, PO-36, PO-38, PO-40, PO-42, PO-43, PO-51, PO-55, PO-59, PO-61, PO-64, PO-65, and PO-71; Pigment Yellows PY-12, PY-13, PY-14, PY-17, PY-20, PY-24, PY-83, PY-86, PY-93, PY-94, PY-109, PY-110, PY-117, PY-125, PY-137, PY-138, PY-139, PY-147, PY-148, PY-150, PY-153, PY-154, PY-166, PY-173, and PY-185; Pigment Blues PB-15 (15:1, 15:2, 15:3, 15:4, 15:6), PB-21, PB-22, PB-60, and PB-64; Pigment Violets PV-19, PV-23, PV-29, PV-32, PV-33, PV-36, PV-37, PV-38, PV-40, and PV-50; and Pigment Greens 7, 10, 36, and 47. The present invention is not limited to these and various pigments may be used.

The above-described pigments may be subjected to surface treatment, such as rosin treatment, acid group treatment, basic treatment, or pigment derivative treatment.

However, preferably, a combination of PB15:6 and PV23 is used for the blue dots of the present invention in view of the color properties, dispersibility, thermal resistance, and the like thereof. In this instance, preferably, the weight ratio of PB15:6 to PV23 (PB15:6/PV23) is in the range of 96/4 to 70/30 and the chromaticity coordinate z in the XYZ colorimetric system measured with CIE standard light source C satisfies $0.73 \leq z \leq 0.81$. More preferably, the weight ratio (PB15:6/PV23) is in the range of 92/8 to 75/25 and z satisfies $0.735 \leq z \leq 0.81$. Still more preferably, the weight ratio (PB15:6/PV23) is in the range of 90/10 to 80/20 and z satisfies $0.745 \leq z \leq 0.81$ The combination of PB15:6 and PV23 has not been considered useful in practice because it is known that mixing PB15:6 with PV23 degrades the transmittance. The inventors, however, found that when the two are mixed with each other at a specific weight ratio within the above-described ranges and z of the resulting dots of the color filter is set in the specific ranges described above, the dots exhibit a relatively high transmittance, contrary to the conventional knowledge.

For the red dots of the color filter of the present invention, preferably, a combination of pigments selected from PR177, PR254, PY138, and PY150 is used in view of the color properties, dispersibility, thermal resistance, and the like thereof. In particular, a combination of PR177 with PR254 is more preferable because it leads to a reduced thickness.

When PR177, PR254, and PY138 are mixed with one another or PR177, PR254, and PY150 are mixed with one another, preferably, the proportions of PR177, PR254, and PY138 or PY150 to the total weight of the pigments are 15 to 50%, 30 to 60%, and 10 to 30%, respectively.

When PR177 and PR254 are mixed with each other, preferably, the proportions of PR177 and PR254 are 3 to 30% and 70 to 97%, respectively. More preferably, the proportions of PR177 and PR254 are 10 to 20% and 80 to 90%, respectively.

For the green dots of the color filter of the present invention, preferably, a combination of pigments selected from PG36, PY138, and PY150 is used in view of the color properties, dispersibility, thermal resistance, and the like thereof. In particular, a combination of PG36 with PY138 is more preferable because it can increase the transmittance.

When PG36 and PY138 are mixed with each other or PG36 and PY150 are mixed with each other, preferably, the proportions of PG36 and PY138 or PY150 to the total weight of the pigments are 30 to 90% and 10 to 70%, respectively.

In the present invention, it is important to combine a color filter having the blue dots whose chromaticity coordinates (x, y) in the XYZ colorimetric system satisfy the expressions 0.13≦x≦0.15 and 0.08≦y≦0.12 and a backlight source whose chromaticity coordinates (x, y) in the XYZ colorimetric system satisfy the expressions 0.265≦x≦0.29 and 0.24≦y≦0.30. Thus, excellent color reproducibility and a white color temperature necessary for liquid television sets (9000 to 11000 K) were achieved for the first time. When the backlight source of the present invention is combined with a conventional color filter to prepare a liquid crystal display device, the entire color takes on a blue tinge and thus the color tone deteriorates. Also, when the color filter of the present invention is combined with a conventional backlight source for desktop monitors, the white color of images takes on a yellow tinge and the white color temperature is reduced; hence the requirements for liquid crystal television sets cannot be satisfied. Preferably, the chromaticity coordinates (x, y) of the backlight source satisfy the expressions 0.265≦x≦0.29 and 0.24≦y≦0.30, more preferably, 0.27≦x≦0.29 and 0.245≦y≦0.295, and still more preferably, 0.275≦x≦0.285 and 0.25≦y≦0.29. More preferably, the characteristics of the color filter and others satisfy the properties described above.

Next, an exemplary method for manufacturing the color filter of the present invention will now be described. A color paste containing at least a polyimide precursor, an organic pigment, and a solvent is applied to the surface of a transparent substrate and is then dried by air, heat, or vacuum. Thus, a colored polyimide precursor film is formed. In the case of drying by heat, preferably, the drying is performed at a temperature in the range of 50 to 180° C. for 1 to 3 hours using an oven or a hotplate. Next, the resulting colored polyimide precursor film is patterned by regular wet etching. First, a positive photoresist is applied to the surface of the colored polyimide precursor film to form a photoresist layer. Subsequently, a mask is disposed above the photoresist layer and is then exposed to ultraviolet light with an exposure apparatus. After exposure, the photoresist layer and the colored polyimide precursor film are simultaneously subjected to etching with an alkaline developer for positive photoresist. After etching, an unnecessary photoresist layer is removed.

The colored polyimide precursor film is heated to be changed into a colored polyimide film. This heat treatment, normally, is performed in the air, a nitrogen atmosphere, or vacuum for 0.5 to 5 hours, in succession or in stages, at a temperature of 150 to 450° C., and preferably at a temperature of 180 to 350° C.

These steps are performed on pastes of three colors, red, green, and blue and, if necessary, on a black-colored paste to complete the color filter for the liquid crystal display device.

Next, the liquid crystal display device using the color filter will be described. The color filter is provided with, if necessary, a transparent protective layer thereon and a transparent electrode, such as ITO, on the protective layer. Subsequently, a liquid crystal-alignment layer subjected to rubbing, which is performed to align liquid crystal molecules, is disposed on the transparent electrode. Next, this color filter substrate and a transparent electrode substrate which is formed by disposing a transparent electrode, such as ITO film, on a transparent substrate are bonded so as to opposing each other and have spacers for maintaining a cell gap therebetween. The transparent electrode substrate may have a thin-film transistor (TFT) element, a thin-film diode (TFD) element, a scanning line, a signal line, and the like in addition to the transparent electrode in order to prepare a TFT liquid crystal display device or a TFD liquid crystal display device. Next, liquid crystal is injected from an inlet provided in a sealing portion, and then the inlet is sealed. Next, after a polarizer is bonded to the external surface of the substrate, an IC driver is mounted, thus completing the liquid display device.

(Measuring Method)

The transmittance and the chromaticity coordinates are measured with a microspectrophotometer "MCPD-2000" produce by Otsuka Electronics Co., Ltd. Each chromaticity coordinate is a value measured at 2-degree field of observation.

The thickness of dots is measured with a surface texture and contour measuring instrument "SURFCOM" 1500A produced by Tokyo Seimitsu Co., Ltd.

The following is a description according to examples of the present invention, but the present invention is not limited to the examples.

EXAMPLES 1 TO 3

A. Synthesis of Polyamic Acid

Prepared were 95.1 g of 4,4-diaminodiphenyl ether, 6.2 g of bis(3-aminopropyl)tetramethyldisiloxane, 525 g of γ-butyrolactone, 220 g of N-methyl-2-pyrrolidone, and subsequently 144.1 g of 3,3',4,4'-biphenyltetracarboxylic dianhydride was added. Then, the mixture was reacted at 70° C. for 3 hours. Then, 3.0 g of phthalic anhydride was added, followed by a reaction at 70° C. for 2 hours to obtain 25 weight percent of polyamic acid solution (PAA-1).

B. Synthesis of Polymer Dispersing Agent

Prepared were 161.3 g of 4,4-diaminobenzanilide, 176.7 g of diaminodiphenyl sulfone, 18.6 g of bis(3-aminopropyl) tetramethyldisiloxane, 2667 g of γ-butyrolactone, 527 g of N-methyl-2-pyrrolidone, and subsequently 439.1 g of 3,3', 4,4'-biphenyltetracarboxylic dianhydride was added. Then, the mixture was reacted at 70° C. for 3 hours. Then, 2.2 g of phthalic anhydride was added, followed by a reaction at 70° C. for 2 hours to obtain 20 weight percent polyamic acid solution (PD-1).

C. Preparation of Dispersed Solution

Using 4.23 g (94 wt %) of Pigment Blue PB15:6 and 0.27 g of Pigment Violet PV23 as pigments, 22.5 g of the above-described polymer dispersing agent, 42.8 g of γ-butyrolactone, 20.2 g of 3-methoxy-3-methyl-1-butanol, and 90 g of glass beads were blended into the pigments. Using a homogenizer, the mixture was dispersed at 7000 rpm for 5 hours and then the glass beads were removed by filtration. Thus, a dispersed solution of 5% of blue pigment (BJD-1) containing pigments PB15:6 and PV23 in a weight ratio of 94/6 was obtained.

D. Preparation of Color Paste

A solution prepared by diluting 20.0 g of the above-described polymer solution (PAA-1) with 30.0 g of γ-butyrolactone was added to 50.0 g of the above-described dispersed solution (BJD-1) to obtain a blue-colored paste (BJP-1).

As in the above, a red-colored paste (RJP-1) containing PR254 and PR177, acting as pigments, in a ratio of 90/10, a green-colored paste (GJP-1) containing PG36 and PY138 in a ratio of 55/45, and a black-colored paste containing carbon black were prepared.

E. Preparation and Evaluation of Colored Coating Film

First, the black-colored paste was applied and dried at 120° C. for 20 minutes. Then, a positive photoresist (OFPR-800 produced by Tokyo Ohka Kogyo Co., LTD) was applied on the black photoresist and dried at 90° C. for 10 minutes. Using an ultraviolet exposure apparatus PLA-501F produced by Canon Inc., light exposure with an ultraviolet light having an intensity of 60 mJ/cm$^3$ and a wavelength of 365 nm was performed through a chrome photomask. After exposure, the sample was immersed in a developer of 2.25% solution of tetramethylammonium hydroxide so that the photoresist and the black coating film were simultaneously subjected to etching. After etching, an unnecessary photoresist layer was removed with acetone. The black coating film was heated at 240° C. for 30 minutes so that the polyimide precursor was converted into polyimide.

Next, the blue-colored paste (BJP-1) was applied to the surface of a glass substrate using a spinner and was then dried at 120° C. for 20 minutes. The blue coating film was subjected to etching and heat treatment as described above to obtain blue dots. In the same way, the red-colored paste (RJP-1) and the green-colored paste (GJP-1) were applied and subjected to etching and heat treatment to obtain red and green dots. An overcoating agent "OPTMER" (SS6917+SS0917) produced by JSR Corporation was applied on the resulting color filter to a thickness of 1 μm and was then subjected to sputtering to form an ITO layer with a thickness of 0.14 μm.

Using glass having ITO and overcoating film as references, the chromaticity coordinates of the blue dots of the resulting color filter were measured with CIE standard light source C, and the results are shown in Table 1 and FIG. 1. Also, the thicknesses of the dots are shown in Table. 1.

EXAMPLES 4 TO 9

Color filters were formed as in Examples 1 to 3 except that Pigment Blue PB15:6 and Pigment Violet PV23 were mixed in the ratios shown in Table 1. Using glass having ITO and overcoating film as references, the chromaticity coordinates of the blue dots of the resulting-color filter were measured with CIE standard light source C, and the results are shown in Table 1 and FIG. 1. Also, the thicknesses of the dots are shown in Table. 1.

TABLE 1

| | Mixture ratio PB15:6/PV23 (wt %) | x | y | Z | Z | Thickness (μm) |
|---|---|---|---|---|---|---|
| Example 1 | 94/6 | 0.137 | 0.123 | 0.740 | 89.2 | 1.60 |
| Example 2 | 94/6 | 0.136 | 0.104 | 0.760 | 83.2 | 2.10 |
| Example 3 | 94/6 | 0.136 | 0.084 | 0.780 | 73.8 | 3.00 |
| Example 4 | 91/9 | 0.139 | 0.121 | 0.740 | 89.2 | 1.40 |
| Example 5 | 91/9 | 0.137 | 0.103 | 0.760 | 83.8 | 1.80 |
| Example 6 | 91/9 | 0.137 | 0.083 | 0.780 | 75.3 | 2.50 |
| Example 7 | 85/15 | 0.141 | 0.109 | 0.750 | 86.5 | 1.29 |
| Example 8 | 85/15 | 0.140 | 0.100 | 0.760 | 84.1 | 1.44 |
| Example 9 | 85/15 | 0.139 | 0.081 | 0.780 | 76.8 | 1.92 |

COMPARATIVE EXAMPLES 1 TO 3

Color filters were formed as in Example 1 except that the mixture ratio of Pigment Blue PB15:6 to Pigment Violet was changed to 98/2. Table. 2 shows the chromaticity coordinates of the resulting color filters measured with CIE standard light source C using glass having ITO and overcoating film as references and the thicknesses of the color filters.

TABLE 2

| | Mixture ratio PB15:6/PV23 (wt %) | X | y | z | Z | Thickness (μm) |
|---|---|---|---|---|---|---|
| Comparative Example 1 | 98/2 | 0.135 | 0.125 | 0.740 | 87.8 | 1.90 |
| Comparative Example 2 | 98/2 | 0.134 | 0.106 | 0.760 | 81.4 | 2.58 |
| Comparative Example 3 | 98/2 | 0.135 | 0.085 | 0.780 | 70.0 | 3.90 |

According to the observation of the resulting color filters with a microscope, a very small amount of cracks was found in the dots of the color filters of Comparative Examples 1 to 3, particularly in Comparative Example 3. In contrast, Examples 1 to 9 did not have any cracks and exhibited excellent dot-shape characteristics. According to the comparison of the dot thicknesses at the same z value, the thicknesses of the dots of Examples 1 to 9 are smaller than those of Comparative Examples 1 to 3. Also, the liquid crystal display devices having any color filter of Examples 1 to 9 caused no or little display failure and exhibited excellent characteristics. In contrast, the liquid crystal display devices having any color filter of Comparative Examples 1 to 3 exhibited disclination and, in particular, the quality of displayed images in Comparative Example 3 was reduced.

EXAMPLE 10

A blue pigment-dispersed solution (BJD-2) of 5% was prepared as in Examples 1 to 3 except than the mixture ratio of Pigment Blue PB15:6 to Pigment Violet PV23 was changed to 88/12. As in Examples 1 to 3, a red pigment-dispersed solution (RJD-2) of 5% containing PR254 and PR177 in a ratio of 90/10 and a green pigment-dispersed solution (GJD-2) containing PG36 and PY138 in a ratio of 55/45 were prepared.

A solution prepared by diluting 5.6 g of the polymer solution (PAA-1) with 38.4 g of γ-butyrolactone was added to 56.0 g of the red pigment-dispersed solution (RJD-2) to obtain a red-colored paste RJP-2. A solution prepared by diluting 1.1 g of the polymer solution (PAA-1) with 31.7 g of γ-butyrolactone was added to 67.0 g of the green pigment-dispersed solution (GJD-2) to obtain a green-colored paste GJP-2. A solution prepared by diluting 14.0 g of the polymer solution (PAA-1) with 51.0 g of (γ-butyrolactone was added to 35.0 g of the blue pigment-dispersed solution (BJD-2) to obtain a blue-colored paste BJP-2.

Next, a color filter was formed as in Examples 1 to 3.

The chromaticity coordinates (x, y) of red, green, and blue measured with CIE standard light source C were (0.655, 0.335), (0.292, 0.593), and (0.138, 0.092), respectively. The chromaticity coordinates (z, Z) of blue were (0.770, 79.4).

A substrate having TFT elements, pixel electrodes, and the like on a non-alkaline glass was prepared separately to serve as an opposing substrate. The opposing substrate and the substrate coated with color pastes (colored layer substrate) were printed with an alignment layer and were subjected to rubbing to align the liquid crystal molecules. One of the two substrates was printed with a sealing agent containing micro rods. After inserting a PET film with a thickness of 5 μm, acting as a spacer, the two substrates were bonded to each other. Next, a TN liquid crystal (refractive index anisotropy Δn~0.1) capable of being saturated at 4 V was injected and a liquid crystal inlet was sealed with a sealing agent. The liquid crystal cell filled with the liquid crystal was disposed between polarizing films with perpendicular polarizing axes to prepare a test liquid crystal cell. The liquid crystal cell was provided with an IC driver or the like, and thus, a liquid crystal display device was completed.

A three-wavelength fluorescent lamp whose chromaticity coordinates (x, y) in the XYZ colorimetric system were (0.280, 0.270) was placed under the prepared liquid crystal cell, and the chromaticity coordinates were measured. The image was colorful and red, green and blue colors had chromaticity coordinates of (0.642, 0.330), (0.292, 0.598), and (0.148, 0.061), respectively, which are equivalent to the EBU standards. Also, the liquid crystal display device having the color filter exhibited a bluish white tone and excellent color balance. The color temperature of the white color displayed thereby was 9800 K and the color properties satisfied the requirements for liquid crystal television sets.

COMPARATIVE EXAMPLE 4

A backlight source for desktop monitors whose chromaticity coordinates (x, y) in the XYZ colorimetric system were (0.305, 0.295) was placed under the liquid crystal cell prepared in Example 10, and the color tone of the white color displayed thereby were measured. The white image took on a yellow tinge and the color balance was unsatisfactory. Also, the color temperature was 7100 K.

COMPARATIVE EXAMPLE 5

A test liquid crystal cell was prepared as in Example 10 except that the red pigment ratio of PR254 to PY150 was changed to 90/10 and that 100% of PB15:6 was used as a blue pigment. The chromaticity coordinates (x, y) of red, green, and blue measured with CIE standard light source C were (0.630, 0.335), (0.298, 0.593), and (0.138, 0.125), respectively.

A three-wavelength fluorescent lamp whose chromaticity coordinates (x, y) in the XYZ colorimetric system were (0.280, 0.270) was placed under the prepared liquid crystal cell, and the chromaticity coordinates were measured. The image was not colorful and red, green and blue colors had chromaticity coordinates of (0.612, 0.337), (0.294, 0.605), and (0.147, 0.085), respectively, which are far from the EBU standards.

INDUSTRIAL APPLICABILITY

As described above, the present invention can achieve a color filter capable of realizing both high color reproducibility and a high transmittance, and can thus provide a high-quality liquid crystal display device. Also, by combining the color filter of the present invention with a specific backlight source, images as colorful as in CRT television sets can be displayed.

What is claimed is:

1. A color filter comprising blue dots whose chromaticity coordinates (z, Z) in the XYZ colorimetric system, measured with CIE standard light source C, satisfy the relational expressions $114>Z>-1087023z^4+3205105z^3-3545958z^2+1744329z-321773$ and $0.730 \leq z \leq 0.810$.

2. A color filter comprising blue dots containing Pigment Blue 15:6 (PB15:6) and Pigment Violet 23 (PV23) such that the weight ratio of PB15:6 to PV23 is in the range of 96/4 to 70/30, the blue dots having a chromaticity coordinate z in the XYZ colorimetric system, measured with CIE standard light source C, satisfying $0.73 \leq z \leq 0.81$.

3. A color filter according to claim 1 or 2, wherein the chromaticity coordinates (x, y) in the XYZ colorimetric system of the blue dots, measured with CIE standard light source C, satisfy the expressions $0.13 \leq x \leq 0.15$ and $0.08 \leq y \leq 0.12$.

4. A color filter according to claim 3, further comprising red dots, wherein the chromaticity coordinates (x, y) in the XYZ colorimetric system of the red dots, measured with CIE standard light source C, satisfy the expressions $0.635 \leq x \leq 0.665$ and $0.31 \leq y \leq 0.35$.

5. A color filter according to claim 4, further comprising green dots, wherein the chromaticity coordinates (x, y) in the XYZ colorimetric system of the green dots, measured with CIE standard light source C, satisfy the expressions $0.22 \leq s \leq 0.34$ and $0.56 \leq y \leq 0.65$.

* * * * *